United States Patent [19]

Cooper et al.

[11] 4,189,677
[45] Feb. 19, 1980

[54] DEMODULATOR UNIT FOR SPREAD SPECTRUM APPARATUS UTILIZED IN A CELLULAR MOBILE COMMUNICATION SYSTEM

[75] Inventors: George R. Cooper; Raymond W. Nettleton; David P. Grybos, all of West Lafayette, Ind.

[73] Assignee: Purdue Research Foundation, West Lafayette, Ind.

[21] Appl. No.: 886,098

[22] Filed: Mar. 13, 1978

[51] Int. Cl.² .......................................... H04L 27/30
[52] U.S. Cl. .............................. 325/321; 179/15 BA; 325/323
[58] Field of Search ................. 325/30, 42, 38 R, 56, 325/65, 473, 40, 321, 323, 322; 343/176, 177; 364/819, 824; 178/67, 69.1; 179/15 BA, 2 E, 2 EA

[56] References Cited

U.S. PATENT DOCUMENTS

| | | | |
|---|---|---|---|
| 2,982,853 | 5/1961 | Price | 325/65 X |
| 3,337,803 | 8/1967 | Costas et al. | 178/67 |
| 4,017,798 | 4/1977 | Gordy et al. | 325/30 X |
| 4,037,159 | 7/1977 | Martin | 325/30 |
| 4,039,749 | 8/1977 | Gordy et al. | 325/320 |
| 4,041,391 | 8/1977 | Deerkoski | 325/42 |
| 4,112,372 | 9/1978 | Holmes et al. | 325/42 |
| 4,134,071 | 1/1979 | Ohnsorge | 325/42 |

*Primary Examiner*—Benedict V. Safourek
*Attorney, Agent, or Firm*—John R. Nesbitt

[57] ABSTRACT

A demodulator unit is disclosed for spread spectrum apparatus utilized in a cellular mobile communication system. The cellular mobile communication system includes a plurality of fixed base stations connected with a central processor so that calls originating in any cell can terminate in any other cell. Each mobile unit has a unique set of time-frequency coded waveforms that are used for both transmission and reception. Message modulation is accomplished by digitizing the speech and encoding the resulting binary sequences into the set of waveforms available to the user, while detection is accomplished by the demodulator unit in which the phases of each received waveform are compared with those of the preceding waveform. The demodulator unit includes a tapped delay line which can have mixers before and after the delay line and can be a narrowband unit with delays and mixers.

11 Claims, 13 Drawing Figures

DEMODULATOR UNIT FOR SPREAD SPECTRUM APPARATUS UTILIZED IN A CELLULAR MOBILE COMMUNICATION SYSTEM

The Government has rights in this invention pursuant to Grant No. ENG75-15649 awarded by the National Science Foundation.

FIELD OF THE INVENTION

This invention relates to demodulating units and, more particularly, relates to a demodulating unit in a spread spectrum apparatus for cellular mobile communication systems.

BACKGROUND OF THE INVENTION

The land mobile radio service has been in existence for some decades. With few exceptions, the service has been restricted to voice communication via frequency-modulation channels. Current practice is to use a central base-station in a given service area, transmitting sufficient power to cover the entire area with adequate field strength. In some cases, satellite stations transmitting the same message may be used to boost signal strength in hard-to-reach areas (the practice known as "simulcasting").

Much recent technical literature has been addressed to the use of a cellular structure as a means of increasing the efficiency of the land-mobile radio service. The proposal is to divide the service area into cells (most often hexagons), each with a base station at its center. The communication link is completed by land line, with radio channels bridging the small gap between each mobile and its nearest base station. If a mobile moves to a new cell, the radio link is switched to the new base station.

Hence, while mobile radio service is now provided, improvements therein have been needed to enable greater satisfactory use of such service, particularly in providing adequate area coverage and in providing more efficient use of the available frequency spectrum. In addition, while improvements such as cellular communications within a service area have heretofore been proposed, such proposals are not fully satisfactory in solving many of the problems presented and/or create new problems.

One such suggested approach has been to provide a unique set of time-frequency coded waveforms to each user for both transmission and reception. The use of such an approach requires the use of a demodulation unit capable and suitable for accomplishing the desired end.

SUMMARY OF THE INVENTION

This invention provides a novel demodulation unit for a spread spectrum system that is particularly useful for cellular mobile communication systems.

It is therefore an object of this invention to provide a novel demodulation unit.

It is another object of this invention to provide a novel demodulation unit for a spread spectrum apparatus.

it is still another object of this invention to provide a novel demodulation unit for cellular mobile communication systems.

It is yet another object of this invention to provide a novel demodulation unit for a cellular mobile communication system utilizing a spread spectrum.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best modes so far devised for the practical application of the principles thereof, and in which.

DESCRIPTION OF THE INVENTION

Figure 1:
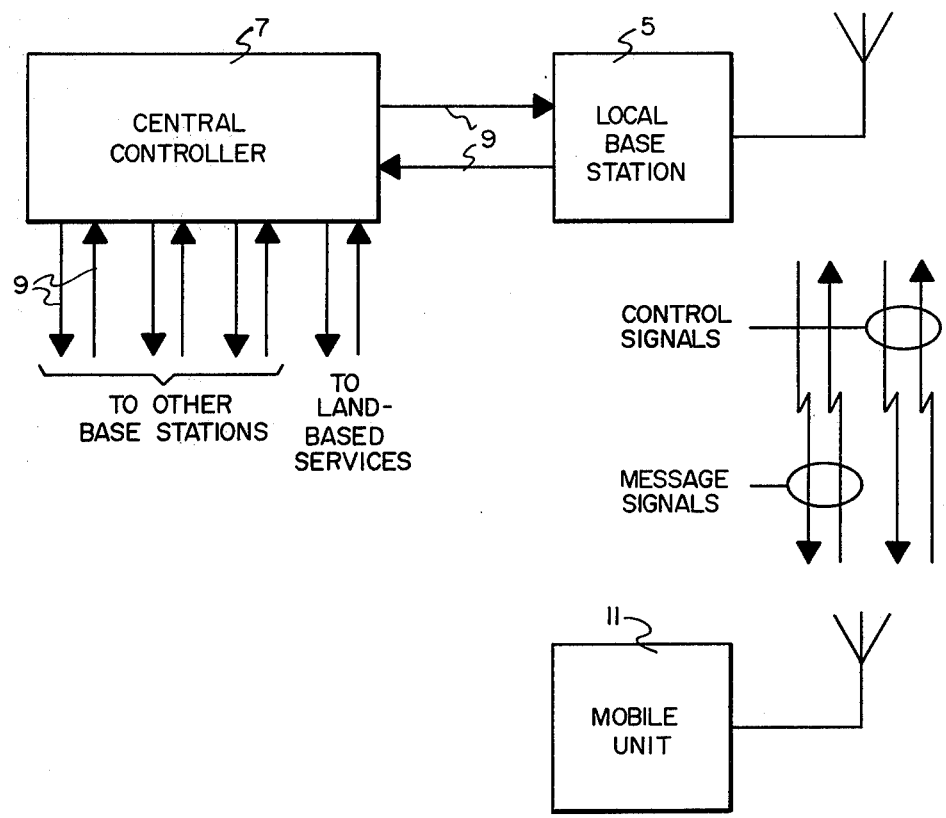
FIG. 1 is a simplified block diagram of the overall system of this invention.

In a cellular communication system, a hexagonal cellular structure is preferably utilized, with a base station (generally designated 5 in FIG. 1) at the center of each hexagon. The base station antenna may be omnidirectional or directional as desired, depending upon the traffic density. The size of the cells can be adjusted as demand for the service grows. A central processor, or controller, 7 provides message links via land lines (or other nonbroadcast means, such as optical fiber link or microwave link), generally designated 9 in FIG. 1, to and from each base station (and to and from any other land based services as indicated in FIG. 1). The processor thus acts as a telephone exchange and performs all system supervisory functions. As also shown in FIG. 1, each base station 5 communicates with the mobile units (generally designated 11) within the cell of that particular base station.

The available band of frequencies is divided in half. One half carries the downstream (base-station-to-mobile) messages, including one dedicated channel per cell reserved for control and supervisory purposes. The other half of the band carries the upstream (mobile-to-base station) messages, including one dedicated channel per cell for call initiation and cell-to-cell handoff.

These two frequency bands may simply be two separate assignments, not necessarily contiguous or even continuous; or they may be subdivided and interleaved (which may improve the performance of the power control system, which relies on reciprocity between upstream and downstream channels).

Each channel used to convey information in the system is defined by a small subset of a large spread spectrum signal set. The spread spectrum signal set is sufficiently large that a permanent, unique channel assignment can be made to each user in a city, even if there are millions of users. Each channel occupies the entire width of the available (upstream or downstream) band, though its spectrum need not be continuous over the band. Energy from each user overlaps energy from all other users both in the time and frequency domains. Each user recognizes, or responds to, only its own assigned signal subset, separating it from the other signals by means of its unique demodulator structure. No attempt is made to synchronize signals from one user to another, and the signals need not be periodic.

Because of the spectral energy overlap between all the signals, it is essential that all signals from a given cell arrive at the receiver input with equal power. In the downstream case, this follows automatically if all signals are transmitted with equal power since they all pass through the same channel.

Figure 2:
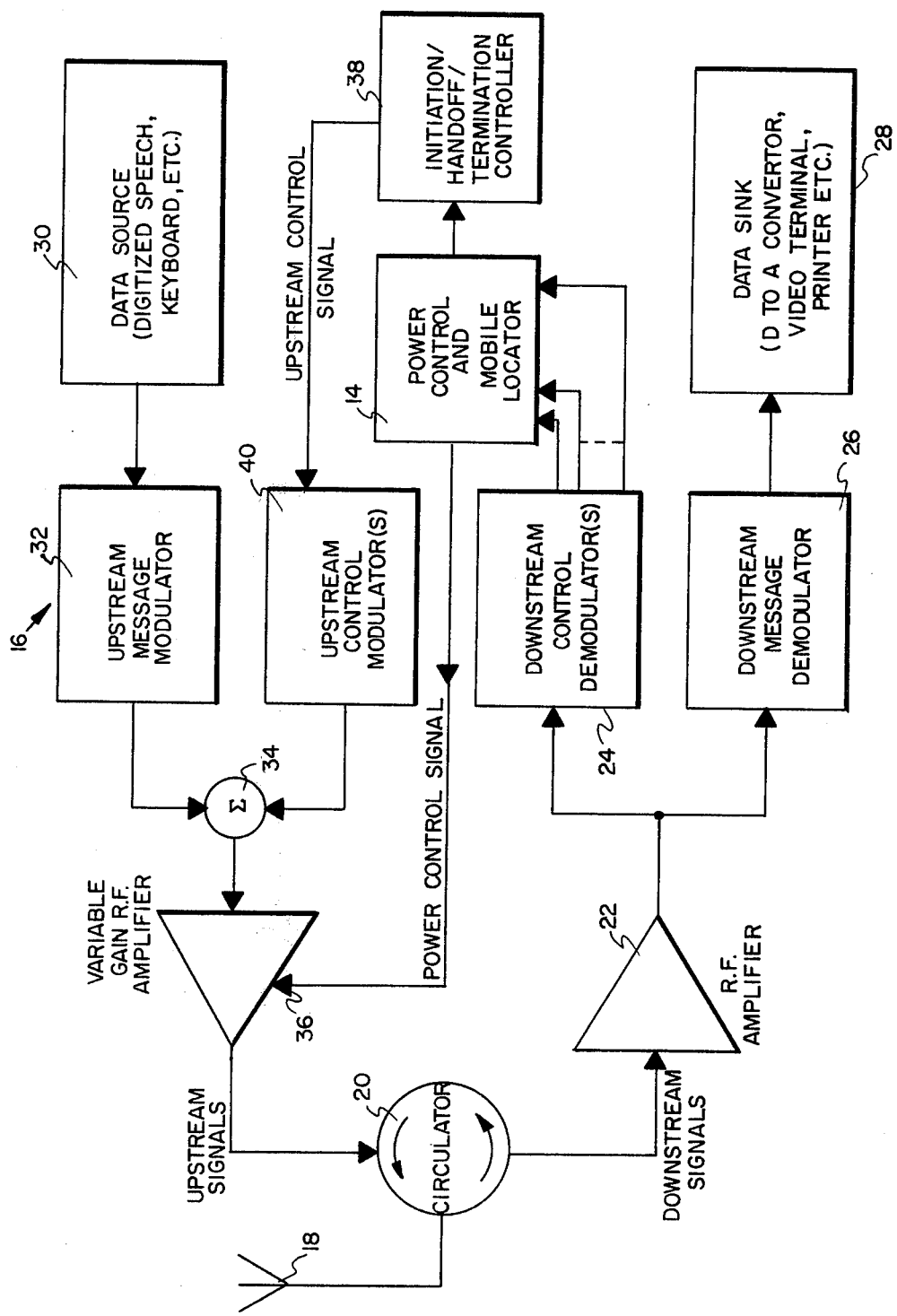
FIG. 2 is a simplified block diagram of a mobile unit having this invention incorporated therein.

Upstream signals are maintained at equal power (measured at the base station) by means of a power control system 14 built into each receiver 16 of each mobile unit 11 (see FIG. 2). The mobile unit 11 monitors the downstream control signal from its local base station 5. As shown in FIG. 2, this is accomplished by receiving the incoming signal on antenna 18 and coupling the same through circulator 20 and RF amplifier 22 to downstream control demodulator 24. Power control system 14 estimates the mean power and controls the transmitted power so that the product of control signal power and transmitted power is a constant. The time-constant of the control circuit is chosen so that at normal vehicular speeds, the power control system compensates for shadow fading but not for Rayleigh fading.

As shown in FIG. 2, the output from RF amplifier 22 is also coupled through downstream message demodulator 26 to data sink 28, while data source 30 provides data to upstream message modulator 32, the output of which is coupled through summation circuit 34 and variable gain RF amplifier 36 to circulator 20. As shown, the power control signal from power controller 14 is coupled to amplifier 36.

The mobile unit also monitors the received power from all the other nearby base stations, and makes a decision periodically as to which cell it most probably is in. If the current decision is different from its predecessor, the mobile unit initiates a cell transfer request from power controller and mobile locator 14 via the upstream control channel through initiation/handoff/termination controller 38 and upstream control modulator 40.

Basing the location decision on field strength measurements is unlikely to yield geographically accurate results, but it does give the strongest possible signal at all times. Hence the vehicle locator system acts like a selection-diversity device.

Thus, message signals are uniguely assigned to each user, and can contain digitized speech or digital data, while control signals are locally unique to one base station but may be re-used at a suitable distance. Downstream signals may be transmitted constantly with strength used to control mobile power and in locator decision, and digital information used for call initiation, hand-off and termination, on a time-shared basis. Upstream signals may be digital information on a time-shared basis used for call initiation, hand-off and termination, and are transmitted only when these functions are required.

Attention is invited to the following references by Cooper, G. R. and Nettleton, R. W., related to this invention: Cooper, G. R. and Nettleton, R. W., "A spread spectrum technique for high capacity mobile communications", Record of the IEEE Conference on Behicular Technology, March 1977; Cooper, G. R. and Nettleton, R. W., "Efficient Spectrum Utilization with Wideband Signals", Technical Report Tr-EE 77-12, Purdue University, published March 1977; Nettleton, R. W. and Cooper, G. R., "Mutual Interference in Cellular LMR Systems: Narrowband and Broadband Techniques Compares", Record of MIDCON/77, IEEE, November 1977; and Nettleton, R. W. and Cooper, G. R., "Error Performance of a Spread-Spectrum Mobile Communications System in a Rapidly-Fading Environment", Record of the National Telecommunications Conference, IEEE, December 1977.

The spread-spectrum signal set of this invention is a time-frequency coded (TFC) signal set that is essentially a set of frequency-hopped carriers designed to possess certain favorable properties.

The construction of the signal set is in three stages.

First, a small set of long-duration time-frequency coded signals are generated algorithmically. This forms the basic signal set. Second, each signal of the basic signal set is divided into several shorter signals. This subdivision retains the same properties as the basic signal set, but provides a much larger set. Each signal thus produced defines a channel; i.e., each signal is uniquely assigned to one user only in the service area. Third, the message data is imprinted on each signal by means of differential biphase modulation. Thus the signals act as frequency-hopped carriers for differentially modulated information.

The basic signal set is a set of sinusoidal, constant-envelope, continuous-phase signals of duration $T_1$ seconds. Each signal is divided into m time-chips of duration $t_1 = T_1/m$ seconds. The frequency of each signal is constant for the duration of each time chip, but is different from time chip to time chip. No frequency is repeated in any one waveform during $T_1$ seconds.

Figure 3:
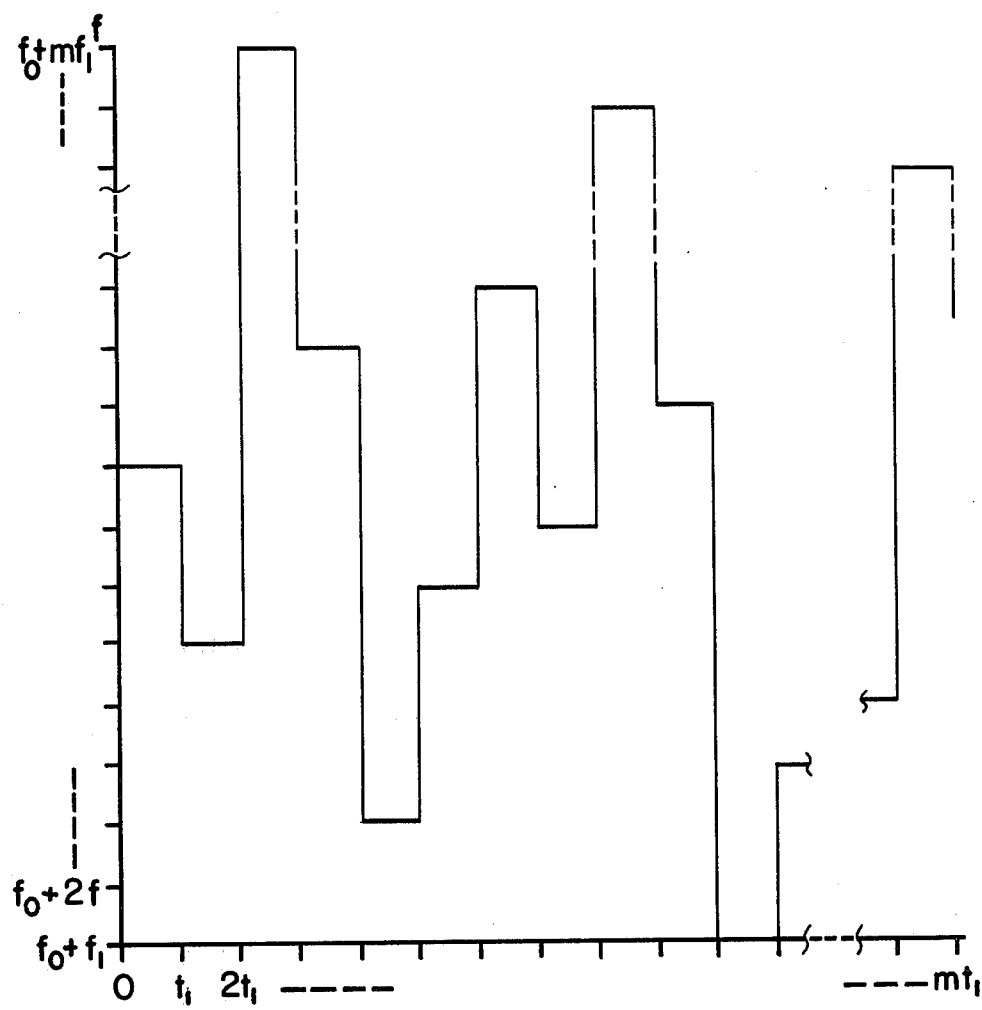
FIG. 3 is a representative time frequency coded waveform.

The frequency assignments are of the form $$f_i^k = f_o + a_i^k f_1$$

where $f_i^k$ is the frequency shift (from some nominal frequency $f_o$) assigned to the ith time chip of the kth signal, and $a_i^k$ is the ith integer of the kth code in the one-coincidence code set. Hence there are m distinct signal waveforms, each with m time chips, and each with a bandwidth of approximately $mf_i$. (The $a_i^k$ are permuted from the set of integers (1, 2, 3,...,m)). FIG. 3 shows a representative signal in the time-frequency plane.

The code sequences $S^k = (a_1^k, a_2^k, a_3^k, ..., a_m^k)$, $k = 1, 2, ..., m$, are all permutations of the integer set (1, 2, 3, ..., m). Since there are m! such permutations, it is not immediately obvious how one goes about selecting the m "best" permutations from the m! possibilities, or indeed why there should only be m such codes. For a more complete discussion of the theory of construction of the codes, attention is directed to G. R. Cooper and R. D. Yates, "Design of Large Signal Sets with Good Aperiodic Correlation Properties," Purdue University, TR-EE-66-13, September 1966. By contrast, however, the method of actually generating such codes is simple and algorithmic, thus:

1. Select a prime number p. (The selection criteria will become obvious in a later section). Then m = p − 1;
2. From the smallest primitive root, b, of p generate the permutation vector II;

$$\pi_p = \{1, (b), (b^2), ..., (b^{m-1})\}$$

where the operation $(b^j)$ denotes the modulo- p-reduced, jth power of b; i.e., $(x) = x - [x/p]p$ where [y] denotes the largest integer $\leq y$;

3. Select an arbitrary starting permutation $S^1$; and
4. Operate on $S^1$ with $\pi_p$ (m−1) times to form the m code sequences. The operation $$S^j = \pi_p S^{j-1} \text{ means}$$
$$a_1^{j-1} = a_b^j$$
$$a_b^{j-1} = a_{b^2}^j$$
$$\vdots$$
$$a_{b^{m-1}}^{j-1} = a_1^j.$$

The mth permutation operation regenerates the original starting vector $S^1$ and the sequence of codes is periodic thereafter. Hence there are m distinct sequences.

The foregoing is illustrated with a simple example. Let p=7. Then b=3, and $\pi_7 = (1, 3, 2, 6, 4, 5)$. Select, say, the starting vector $S^1 = (1, 2, 3, 4, 5, 6)$
$S^2 = (5, 3, 1, 6, 4, 2)$
$S^3 = (4, 1, 5, 2, 6, 3)$
$S^4 = (6, 5, 4, 3, 2, 1)$
$S^5 = (2, 4, 6, 1, 3, 5)$
$S^6 = (3, 6, 2, 5, 1, 4)$ and finally back to $S^1 = (1, 2, 3, 4, 5, 6)$ ... and so on.

The example also serves to illustrate most of the following general properties of the TFC signal sets:

If the codes are synchronized and if $f_1 t_1 = k$, where k is any integer, the signals are all mutually orthogonal. That is, no number is repeated in any column of the above code set. Generally the condition $f_1 t_1 = 1$ would hold for orthogonality, since $f_1 t_1 > 1$ produces a spectrally inefficient set.

If synchronization is not employed, no two signals have more than one frequency coincidence for any time shift. This is referred to as the one-coincidence property and may be verified by shifting any row in the above code set to the right or left. The one-coincidence property is the design feature which is responsible for the uniformly-small aperiodic cross-correlation property of the TFC signal set. The envelope of the normalized cross-correlation function for the one-coincidence sets, $V_{ij}(\tau)/E$, has been shown to have the following upper and lower bounds--

$$\frac{1}{m\sqrt{f_1 t_1}} \leq \frac{V_{jk}(\tau)}{E} \leq \frac{\ln(m)}{\sqrt{\frac{m}{2}(f_1 t_1 m + 1)}}$$

for $\frac{1}{m} \leq f_1 t_1 \leq 1$.

Figure 4:
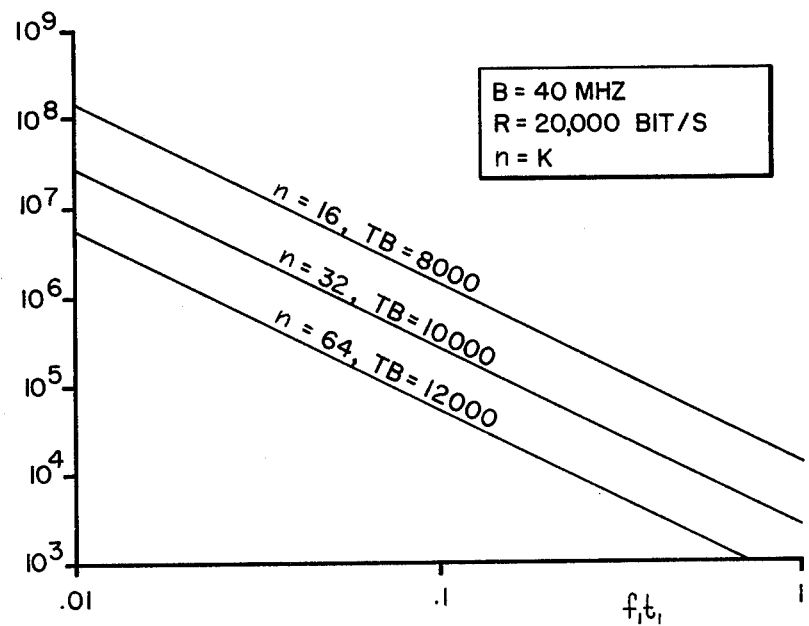
FIG. 4 is a graph showing the number of unique codes M vs. $f_1 t_1$.
Figure 5:
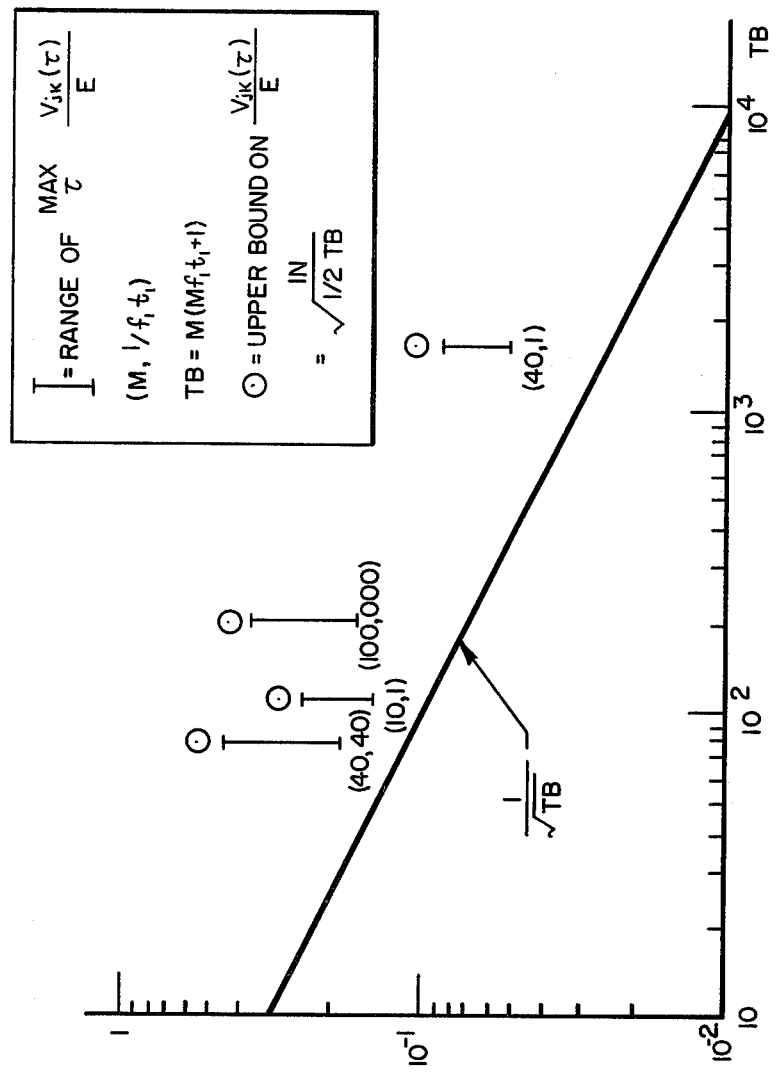
FIG. 5 is a graph showing the summary of cross-correlation properties of sets.

This property permits a number of users to transmit independent, unsynchronized signals with minimal mutual interference, provided that all signals are received with equal power. FIG. 4 shows the spread of experimental data in relation to the above bounds, from computer simulations of the system. Note that performance is generally better for the orthogonal ($f_1 t_1 = 1$) codes, as one would expect. The data was generated from codes in which the starting vector was the permutation operator itself.

The signal waveforms from the undivided signal set have approximately uniform spectra with bandwidth $\approx mf_1 + (1/t_1)$.

The magnitudes of the cross-correlation envelopes set a limit on the number of units which may use the system simultaneously for a given performance criterion (output signal to noise ratio for speech, for example). The system does not, however, exhibit a blocking characteristic; if the limit is exceeded, the consequence will simply be a degradation in performance for each unit. Depending on the parameters chosen, the system might be substantially overloaded before communication becomes seriously impaired. This is the characteristic known as "graceful degradation under overload conditions."

The basic signal set may be split into shorter signals of length n (n<m) to generate a new set of (m/n)m signals ((x) denotes the largest integer equal to or less than x). In the new set, if the frequency slots do not overlap, i.e., if $f_1 t_1 = 1$, each signal will be orthogonal to at least (m−1) other signals with synchronization, and to (m/n)−1 signals without synchronization. In either case, the one-coincidence property will still hold for all pairs of divided signals. The number of TFC signals generated by the subdivision process is proportional to $m^2$ (approx.) rather than m in the undivided case. Maximum efficiency occurs if n is an integer power of 2.

It is the divided TFC signal set that finds application in the mobile radio case. Specifically, it is anticipated that each mobile unit will be assigned one signal from the divided set, and will communicate by imprinting a biphase code onto the assigned waveform. Thus each user is both identified and addressed by the same unique signal. This assures both RADA (random access, discrete address) and privacy capabilities as an integral part of the system design. With p in the hundreds, some tens of thousands of unique codes may be generated. For example, suppose this is a system with an available bandwidth of 40 MHz and each user required a bit rate of 20 kbit/s. FIG. 4 shows the number of unique codes, M, versus $f_1 t_1$.

Note that in the divided signal set case, the signal spectrum from each unit is not expected to be either continuous or uniform. Rather each signal will have n narrow band spectral domponents distributed quasi-randomly over the band with a frequency spacing (as an average) of B/n where B is the total available bandwidth for the system.

The signal waveforms from the previous stage may each be used as frequency-hopped "carriers" for a biphase (or multiphase) coded message, thus:

$$s^k(t) = c_1^k(t) \sqrt{2S} \cos 2\pi(f_o + a_1^k f_1 + \theta_1), 0 < t < t_1$$

$$= c_2^k(t) \sqrt{2S} \cos 2\pi(f_o + a_2^k f_1 + \theta_2), t_1 < t < 2t_1$$

$$\vdots$$

$$= c_m^k(t) \sqrt{2S} \cos 2\pi(f_o + a_m^k f_1 + \theta_m), (m-1)t_1 < t < mt_1$$

where $c_i^k(t) = \pm 1$ are constant for a given waveform period and represent the transmitted message; and S represents the power of the signal. The $\theta_i$ are the phase constants needed to give the signal its "continuous-phase" property; i.e., to ensure that the waveform "chips" will "join at the edges." They are not needed (i.e., they are all zero) if $f_o + f_1 t_1 = k$ for k some integer, since this guarantees that each chip will contain an integer number of cycles.

The signal subset of the third stage assigned to each user is an "alphabet" of $2^n$ distinct phase-modulated versions of the user's designated frequency sequence. If orthogonal coding is used, each waveform transmitted will contain log $_2$n bits of message information.

The signal received either by or from a mobile unit will arrive at the receiver antenna via a large number of paths. Hence the received signal has a coherence bandwidth typically of the order of magnitude of 30 kHz. Phase coherence between frequency slots is therefore lost entirely in the channel. Further, the received electromagnetic field near the antenna has a coherence distance of about one-half wave-length, so that a moving mobile unit will encounter loss of phase coherence in each frequency slot in a very short time.

To overcome this difficulty, a differentially coherent biphase coding scheme is utilized. The phase of each time chip is compared with the phase of the corresponding time chip in the previous waveform to provide the channel information bit contained in that chip. If $b_i^k = \pm 1$ is the ith channel bit for the kth transmitted waveform, than $$c_i^k = c_i^{k-1} \text{ if } b_i^k = 1$$
$$= c_i^{k-1} \text{ if } b_i^k = -1$$

The channel signal alphabet has n distinct elements, chosen as the rows of the nth order Hadamard matrix $H = (h_{ji})$. If the kth transmitted waveform conveys message element j, then $$b_i^k = h_{ji}.$$

Since there are n distinct channel message elements, they convey log $_2$n message bits.

The time-frequency coded waveforms described above represent only one of a wide variety of similar waveforms possible. The demodulator described next can be used with the TFC signal set described above, or with any other time-frequency codes which may arise in the future, provided that the message information is imprinted by the differential bi-phase modulation method just described.

The operations performed on the incoming TFC signal by the message demodulator are as follows:

(1) The signal is delayed in integer multiples of $t_1$ up to a maximum of $(2n-1)t_1$. Thus there are 2n separate delayed versions of the signal available in the demodulator;

(2) Bandpass filters select the appropriate frequency bands from the delayed signals, in the reverse order of the frequency sequence of the desired signal. Hence the first frequency is selected at delay points $(2n-1)t_1$ and $(n-1)t_1$; the second at $(2n-2)t_1$ and $(n-2)t_1$; and so on, with the last frequency selected at $nt_1$ and zero delay (the filtering process may be performed either before, during or after the delay process). Operations (1) and (2) realign the time chips of the two most recent incoming signal waveforms, so that all 2n of them appear at a set of terminals simultaneously;

(3) Each pair of the delayed signals of the same frequency is multiplied together, then low-pass filtered to remove the double frequency component. This operation compares the phases of corresponding time chips in the two most recent signals. Each low-pass filter output will be positive if the phases are the same (or differing by less than $\pm\pi/2$ radians) and will be negative if the phases are opposing (or differing by greater than $\pm\pi 2$ radians);

(4) A threshold detector examines the sum of the absolute values of the output of operation (3) and closes a set of n analog gates (sampling switches) when the sum exceeds a specified threshold value. The sampling switches then transfer the n signals to operation (5);

(5) Let the n sampled signals from operation (4) be the ordered elements of a vector q. Let H be the nth order Hadamard matrix. Then $$\underline{Q} = \underline{H}\underline{q}$$

describes operation (5), a diagonalizing operation. Q is the n vector of output signals. In the absence of noise and fading, Q will have only one nonzero element, corresponding to the transmitted signal. Generally, Q will have no nonzero element, but the most probable location of the most positive element will still correspond to the transmitted message. Because each element of the vector $\underline{Q}$ contains energy from all elements of the vector $\underline{q}$, the linear combiner operation provides the receiver with a high level of frequency diversity. It is for this reason that the demodulation error performance is nearly as good in a dispersively fading channel as it is in a linear channel. Also for this reason, the performance of the receiver increases significantly with increasing n (the inventors have determined that $n \geq 32$ is necessary for good performance in the presence of fading); and (6) The elements of the vector $\underline{Q}$ are scanned to identify the most positive element. This element is then declared to correspond to the transmitted message. Operation (6) produces a maximum-likelihood estimate of the transmitted message. The estimated message may be expressed in binary form, or any other form compatible with the requirements of the data sink.

Figure 6:
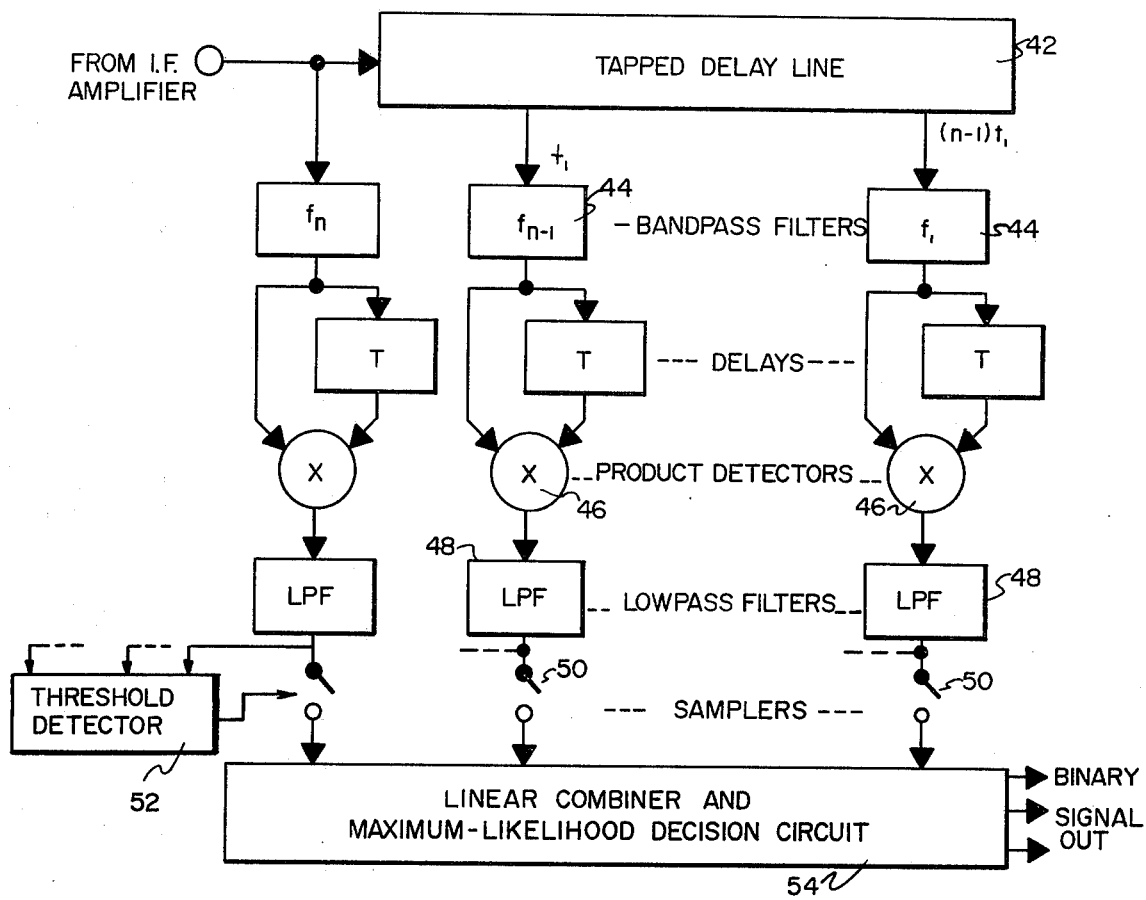
FIG. 6 is a receiver demodulator that may be utilized in this invention.

FIG. 6 shows the way in which the above sequence of operations can be performed. As shown, tapped delay line 42 receives the signals and couples the same through band pass filters (generally designated 44) and delays (generally designated 45) to product detectors 46. The outputs from the detectors are coupled through low pass filters 48 and through sampling switches 50 controlled by threshold detectors 52 to linear combiner and maximum-likelihood decision circuits 54.

The basic TFC signal receiver can be broken into two major components. The frontend-demodulator unit (see FIGS. 8 and 9) takes the received radio frequency TFC signal and demodulates the information contained in the 2n time chips of two adjacent waveforms. The decoder-decision circuit (see FIG. 7) takes the received information from the frontend-demodulator and decides if the signal received is the desired signal. If the proper signal is received, the decoder-decision circuit decodes the received signal as a member of the code alphabet. The output data corresponding to the code alphabet entry is then delivered as output of the TFC message demodulator.

This basic receiver structure is used in all receiver applications in the TFC spread spectrum cellular land mobile system, such as message signal and control signal reception.

Each output of the frontend-demodulator circuit is a member of $\underline{r}$. Each output is a demodulated differential-phase-shift-keyed sinusoidal pulse from the TFC signal. The n sinusoidal pulses that make up the TFC signal are delayed by appropriate amounts so that they are demodulated at the same time. The delayed demodulated sinusoidal pulses all arrive at the output at the same time.

The decoder-decision circuit takes the vector $\underline{r}$, the demodulated time coincident TFC signal and compares it to each of the $\underline{c}^j$. A decision is made as to which of the $\underline{c}^j$ is "most similar" to the received $\underline{r}$. The output data corresponding to the chosen code alphabet entry $\underline{c}^j$ is then delivered as output.

Since a decoder-decision circuit is common to all versions of the TFC signal demodulator, regardless of the type of frontend used, it is discussed first.

Figure 7:
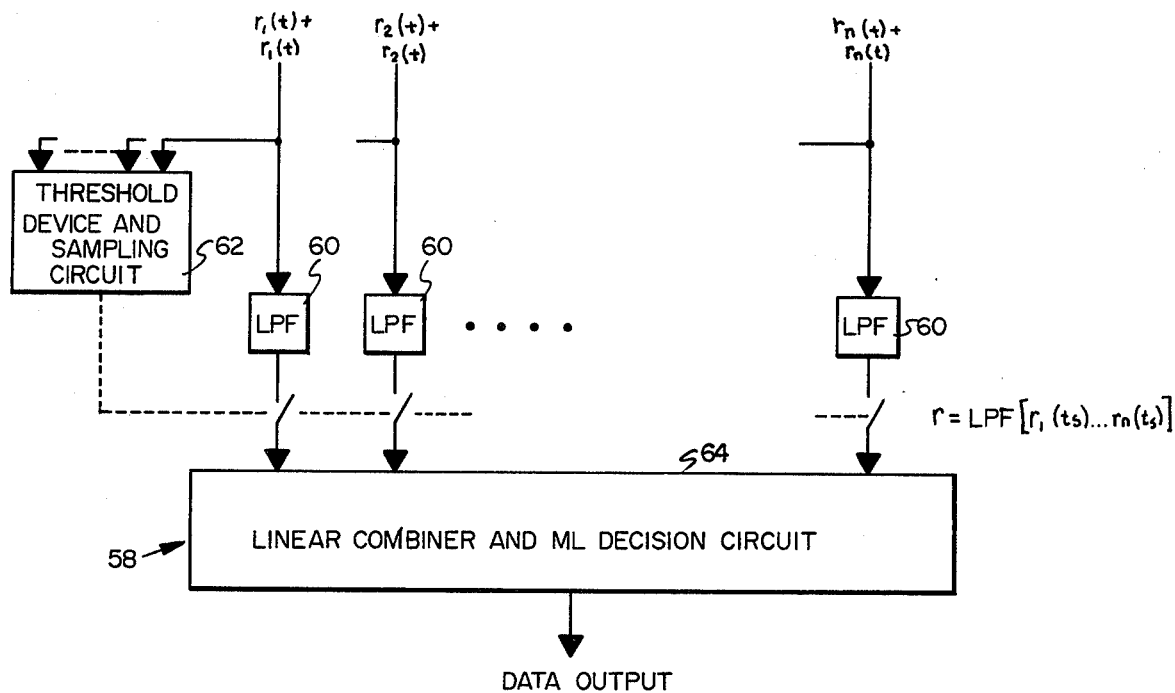
FIG. 7 is a block diagram of a decoder decision circuit that can be utilized in this invention.

As shown in FIG. 7, the decoder-decision circuit 58 consists of low-pass filters 60, a threshold device and sampling circuit 62, and a linear combiner and maximum likelihood decision circuit 64.

The threshold device compares the $$\sum_{i=1}^{n} |r_i(t) + n_i(t)|$$

to a threshold level. If the $$\sum_{i=1}^{n} |r_i(t) + n_i(t)|$$

exceeds the threshold level, the signal is sampled and $\hat{\underline{r}}$ is input to the linear combiner and ML decision circuit. The ith element of $\hat{\underline{r}}$ is the low pass filtered $r_i(t) + n_i(t)$. The choice of the output is made by maximum likelihood comparison between $\hat{\underline{r}}$ and $\underline{c}^j$. The $\underline{c}^j$ most similar to the $\underline{r}$ is chosen. The linear combiner and maximum likelihood decision circuit pick the most positive $$\underline{r}\underline{c}^j, j=1, 2, ..., n.$$

This operation could be performed by either dedicated hardware or by a software based microprocessor system.

Figure 9:
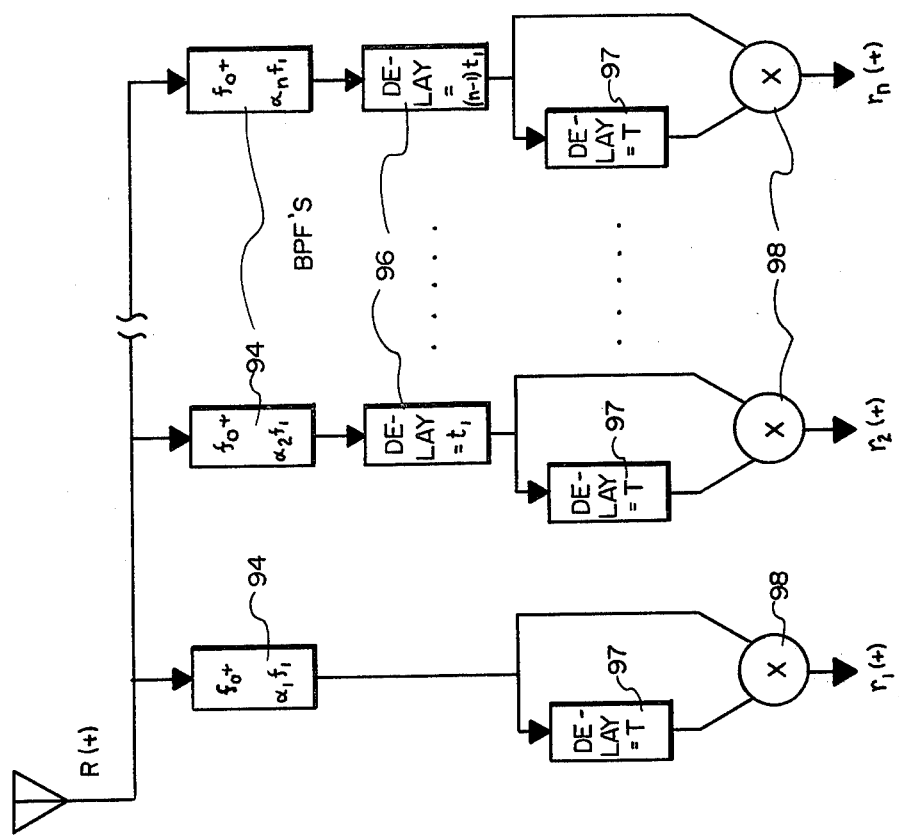
FIGS. 8 and 9 are block diagrams of alternate embodiments of the front end of the demodulator that can be used in this invention.
Figure 8:
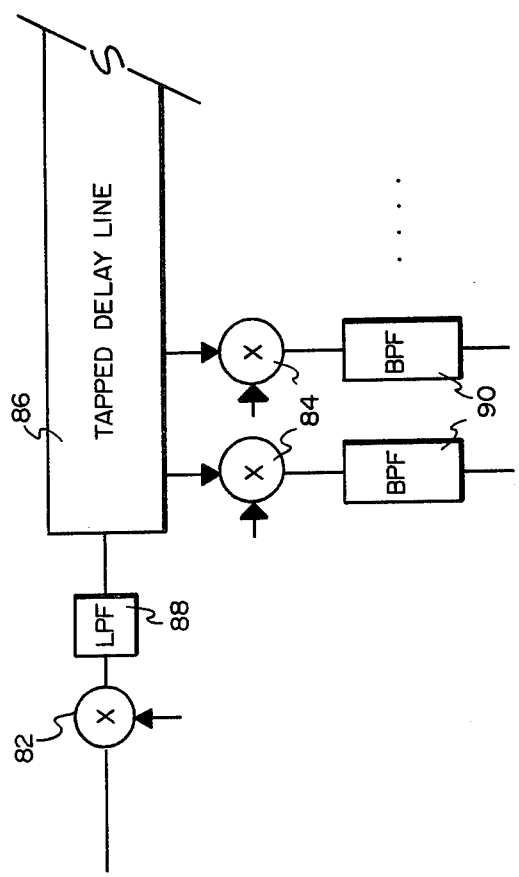
Figure 10:
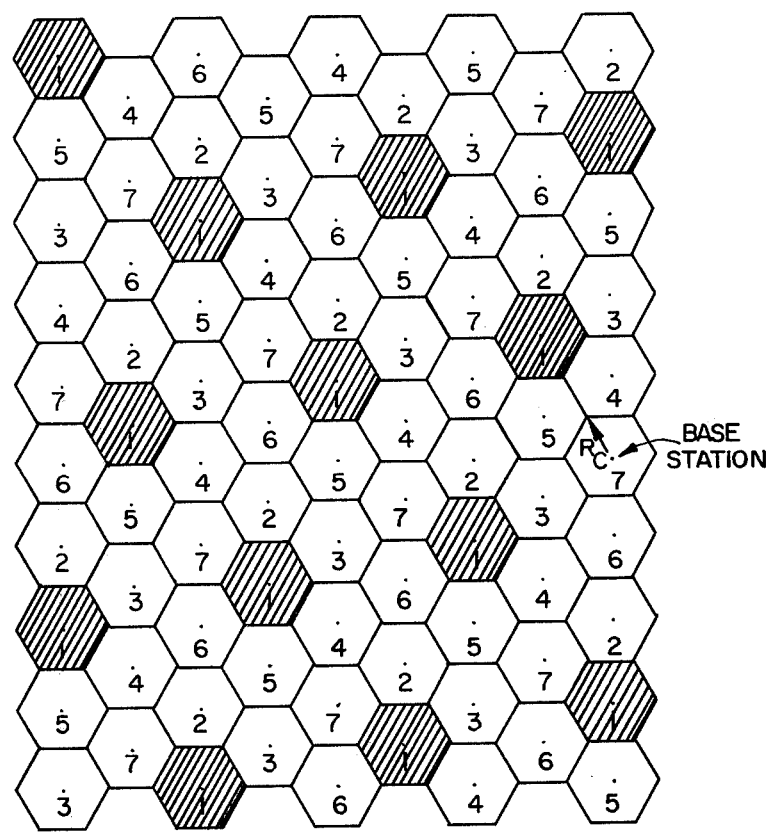
FIG. 10 is a representative cellular layout.

The frontend-demodulator circuit can take many forms, such as, for example, as shown in FIGS. 8 and 9. The basic components are bandpass filters and delay lines arranged in various configurations. The center frequencies of the bandpass filters correspond to the frequencies of the n carrier bursts that make up the TFC signal. The selection of these center frequencies to correspond to a particular signal in the signal set uniquely determine the coding and address of the receiver. Bandpass filters should be of suitable design to facilitate a change in center frequency. This allows one general receiver to be coded to receive any signal in the signal set.

The delay lines must be able to delay an analog signal by an amount $nt_1$, where n is determined by the application of the delay line in the receiver and $t_1$ is the duration of one chip. The delay line bandwidth also depends on the delay line application in a particular receiver configuration. The bandwidth required is typically either at least B, the system bandwidth for the upstream or downstream channel, or the bandwidth of the bandpass filters.

The delays can be implemented by either pure analog components, sampled analog components, quantizers and digital components or any combination of these techniques.

The broadband delay frontend-demodulator 72, as shown in FIG. 8, consists of mixers 82 and 84 at the inputs and outputs, respectively, of a tapped delay line 86, and bandpass filters 88 and 90 to suit the center frequency requirements of the tapped delay line and filters. The tapped delay line has bandwidth B and total time delay 2T. The spacing between taps correspond to a delay of $t_1$. The bandpass filters also have center frequencies that correspond to the frequencies of the carrier bursts that make up the TFC signal assigned to the receiver.

The delay may be realized by any of the aforementioned techniques as long as the technology utilized can produce a delay of 2T with bandwidth B and with taps corresponding to delays evert $t_1$ seconds. The broadband delay has a time-bandwidth product of 2TB.

Identical BPF's could be used if the local osillators feeding the mixers are selected to translate the frequency of the ith chip into the BPF filter center frequency. The coding of the receiver is then done by adjusting the local oscillators instead of adjusting the BPF center frequencies.

The narrowband delay frontend-demodulator performs the bandpass operation before the delay lines and is shown in FIG. 9. As shown, filters 94 receive the input signals and couple the same through delays 96 and 97 to mixers 98. This allows the delay lines to have much smaller bandwidths than the delay line used in the wideband delay frontend-demodulator. The delays of T are now required to get $y[t-(j-1)t_1-T]$ as the second input to the multiplier.

This structure allows the use of components that are easier to construct. The narrowband version requires at least $2n-1$ narrowband delay lines of various delay times. Only one broadband delay line is required in the broadband delay frontend-demodulator. The narrowband delays require time-bandwidth products on the order of $2T/t_1$.

The basic narrowband delay frontend-demodulator could also be modified by the use of mixers at any point in the circuit. The mixers would be used to match the operating frequency requirements of the component devices.

The narrowband delays could be constructed using any technique capable of the required delay time and bandwidth. This structure is especially suited for the application of charge transfer devices and monolithic integrated circuits.

It is assumed that the base stations will each be assigned a locally unique TFC signal subset for use as the upstream and downstream control signals (UCS and DCS). Each base station transmits its signal periodically and with constant power with a relatively low pulse repetition frequency. The purpose of the low p.r.f. is to allow each radiated signal to clear the immediate area before the next base station transmits its signal. Hence the DCS of each nearby base station will appear at the input of every receiver at a different time to all the others. With p.r.f.'s of a few kilohertz, as few as seven distinct DCS frequency sequences allocated in the manner as shown and described, will suffice to yield satisfactory operation of the power control/mobile locator system.

The operations performed by the power control/mobile locator system are as follows (let P be the number of distinct signal subsets assigned to the base stations as DCS's):

(1) Each receiver contains P demodulators, each designed to receive one of the DCS's. The output of each demodulator is a scaler signal proportional in magnitude to the incoming power of its DCS;

(2) Each demodulator output signal is multiplied by a constant. The value of the constant is unity for the $(P-1)$ signals which have not been selected as identifying the local base station; the remaining signal is multiplied by some constant greater than one. The purpose of this weighting technique is to introduce some "hysteresis" into the decision process. Hysteresis appears to be desirable in order to discourage vacillation of the locator decision when a mobile unit is near the border of its cell. A constant on the order of 1.5 has been found to give satisfactory results. However, this operation is generally to be regarded as optional;

(3) The signal identified as coming from the local base station is averaged over H samples, and the averaged signal is used to control the output power of the mobile transmitter. This may be done via a power control loop, a voltage controlled amplifier or attenuator or any other suitable means. The law governing the power control operation is that the product of DCS power and transmitted power must be a constant. The constant is determined as a system design parameter and is the same for all mobile units;

(4) Each weighted demodulator output signal is passed through a threshold detector which passes any signal to its output only if it exceeds a given threshold level. The P threshold circuits have the same threshold level. These signals are then averaged over K samples, after which the P averaged signals are passed via sampling switches to operation (5); and (5) The P averaged signals are scanned to determine the most positive signal, and that signal is declared to identify the local base station. This operation amounts to a maximum-likelihood estimate of the nearest base station. The decision is passed back to the hysteresis circuit of operation (2) and to the averaging circuit of operation (3).

Figure 11:
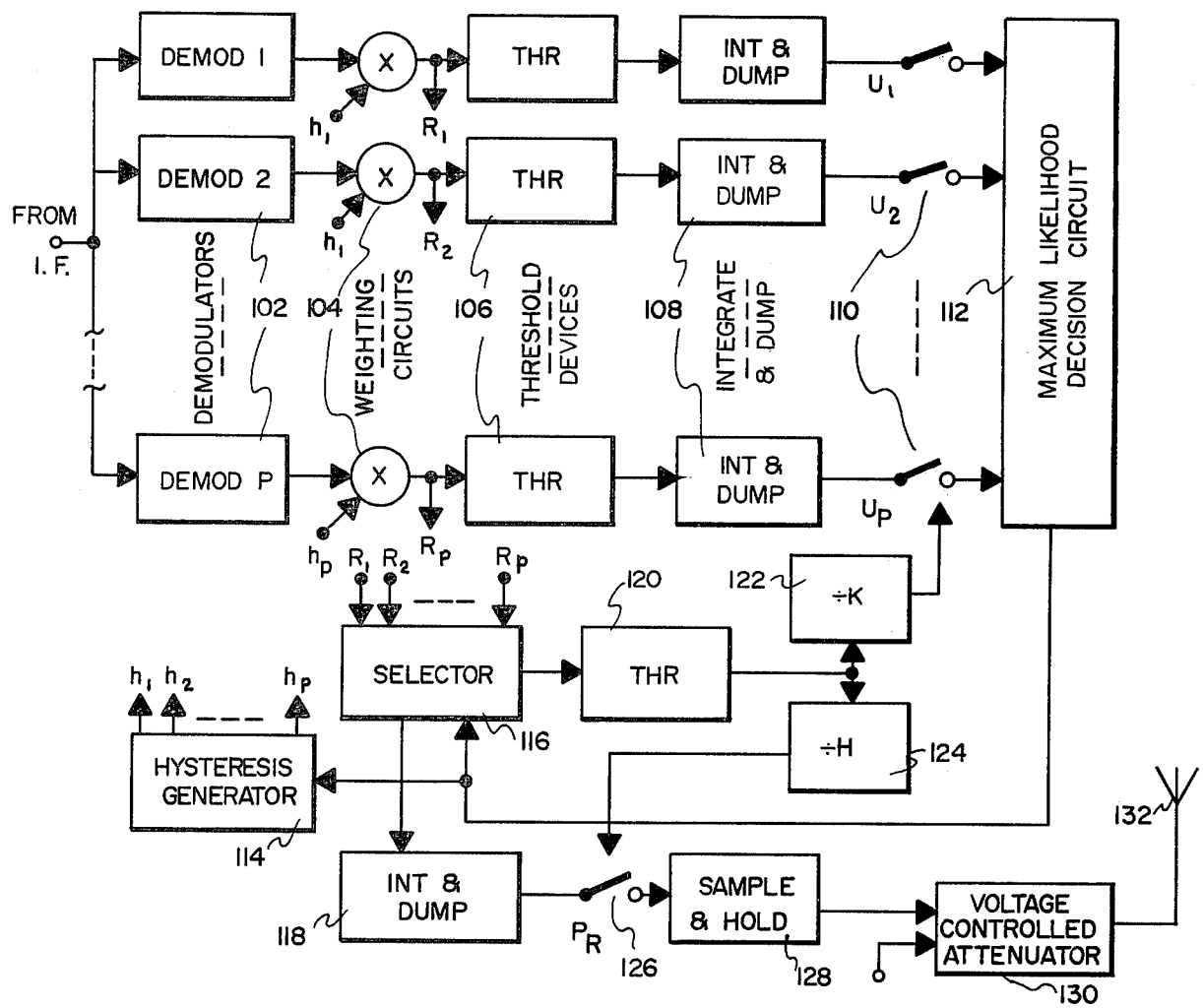
FIG. 11 is a block diagram of a power control/mobile locator system that can be utilized in this invention.

FIG. 11 shows a typical block diagram of the power control/mobile locator system. As shown, the input signals from the IF are coupled through parallel connected demodulators (generally designated 102), weighting circuits (generally designated 104), threshold devices (generally designated 106), integrate and dump circuits (generally designated 108), and switches (generally designated 110) to maximum-likelihood decision circuit 112. An output from maximum likelihood decision circuit 112 is coupled to hysteresis generator 114 (which supplies a second input to weighting circuits 104) and to selector 116 which supplies an output to integrate and dump circuit 118. Selector 116 also supplies a output through threshold circuit 120 to divide-by-k circuit 122 and divide-by-H circuit 124, which circuits control switches 110 and switch 126, respectively. When switch 120 is closed, an output is coupled from integrate and dump circuit 118 to sample and hold circuit 128, the output of which is coupled to voltage controlled attenuator 130 through which the upstream signal is coupled to antenna 132.

The demodulators may be constructed in a similar way to the message demodulator, except that it is necessary only to detect the presence of the signal and its magnitude for the power/mobile locator function. Hence the differential phase operation is not required in general. The operations performed by these simplified demodulators are as follows:

(1) The signal is delayed by integer multiples of $t_1$ up to a maximum of $(n-1)t_1$. Hence there are n delayed versions of the signal (starting with zero delay) in each demodulator;

(2) Each delayed signal is bandpass filtered, with center frequency in reverse order of the assigned frequency sequence of the desired DCS. Thus the undelayed signal is filtered at $f_n$, and so on, with the $(n-1)t_1$ delayed signal filtered at $f_1$. Operations (1) and (2) align the time chips of the signal so that they all appear at the output of the filters simultaneously, and operations (1) and (2) may be reversed in order if desired; and (3) The filtered and delayed signals are each squared, lowpass filtered to remove the double frequency component and then summed. The output from the summer is therefore proportional to the sum of the squares of the amplitudes of each time-chip component in the selected DCS; i.e., it is an estimate of mean received DCS power. The estimate is already averaged over n independent samples because the statistics of each frequency slot are independent in the multipath channel; and the estimate can be improved further by the averaging operation (3) of the power control system.

Figure 12:
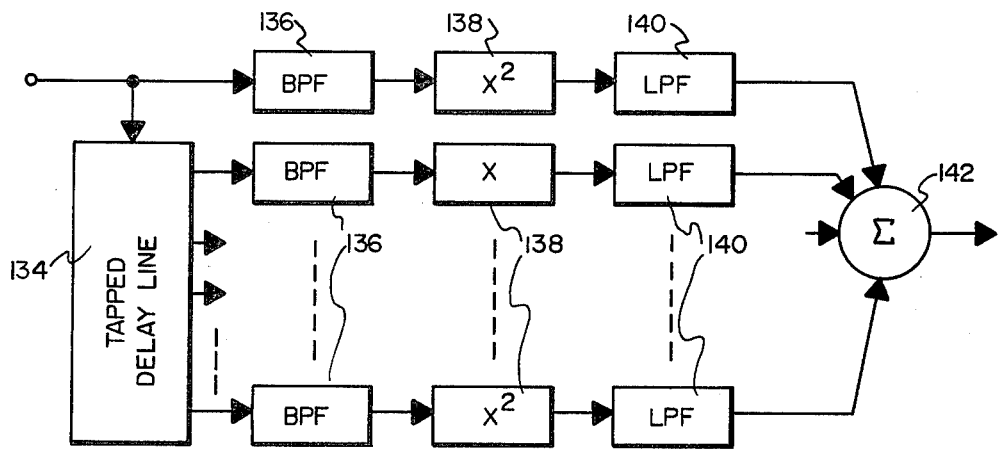
FIG. 12 is a block diagram of the demodulator shown in FIG. 11.

FIG. 12 shows a typical block diagram of a power control/mobile locator demodulator. As shown, the input signal is coupled through tapped delay line 134 to parallel circuits each including a bandpass filter 136, squaring circuit 138, and lowpass filter 140, after which the signals are summed at summation circuit 142.

Downstream control signal data will be required for call initiation/termination/handoff operations. This may be differentially phase modulated onto the DCS as described in the spread spectrum signal set description. If this is done, it will be necessary to substitute a message demodulator for the simplified demodulator (just described) corresponding to the local station. This may be done electronically in response to the mobile locator decision, or (if economically feasible) all the demodulators may be of the message type. Probably the most obvious method is to electronically convert the "local" demodulator, when it is identified, from the "simplified" type to the "message" type.

The power control/vehicle locator signal may be taken from the input to the threshold detector summing circuit of the DCS message demodulator.

An alternative implementation of the power control/mobile locator system, requiring only one modulator and one DEC waveform, could be implemented if biphase coding is used to identify the base stations instead of a group of different codes. In that case, the following modifications of the system just described are required:

(1) Each base station emits a DCS, on which biphase information is modulated to identify it in a local sense. These emissions are timed such that they cannot coincide in time in the receiver of any mobile unit from nearby base stations;

(2) A simple differentially-coherent demodulator as described under "TFC Message Demodulator" is used to extract the binary information in the DCS. (Not all bits in a waveform need be used for identification; any remaining bits can be used for other control functions); and (3) A "pigeon-holing" operation routes the signal strength information to the appropriate averaging channel for the ML base-station decision, using the binary identification information.

Figure 13:
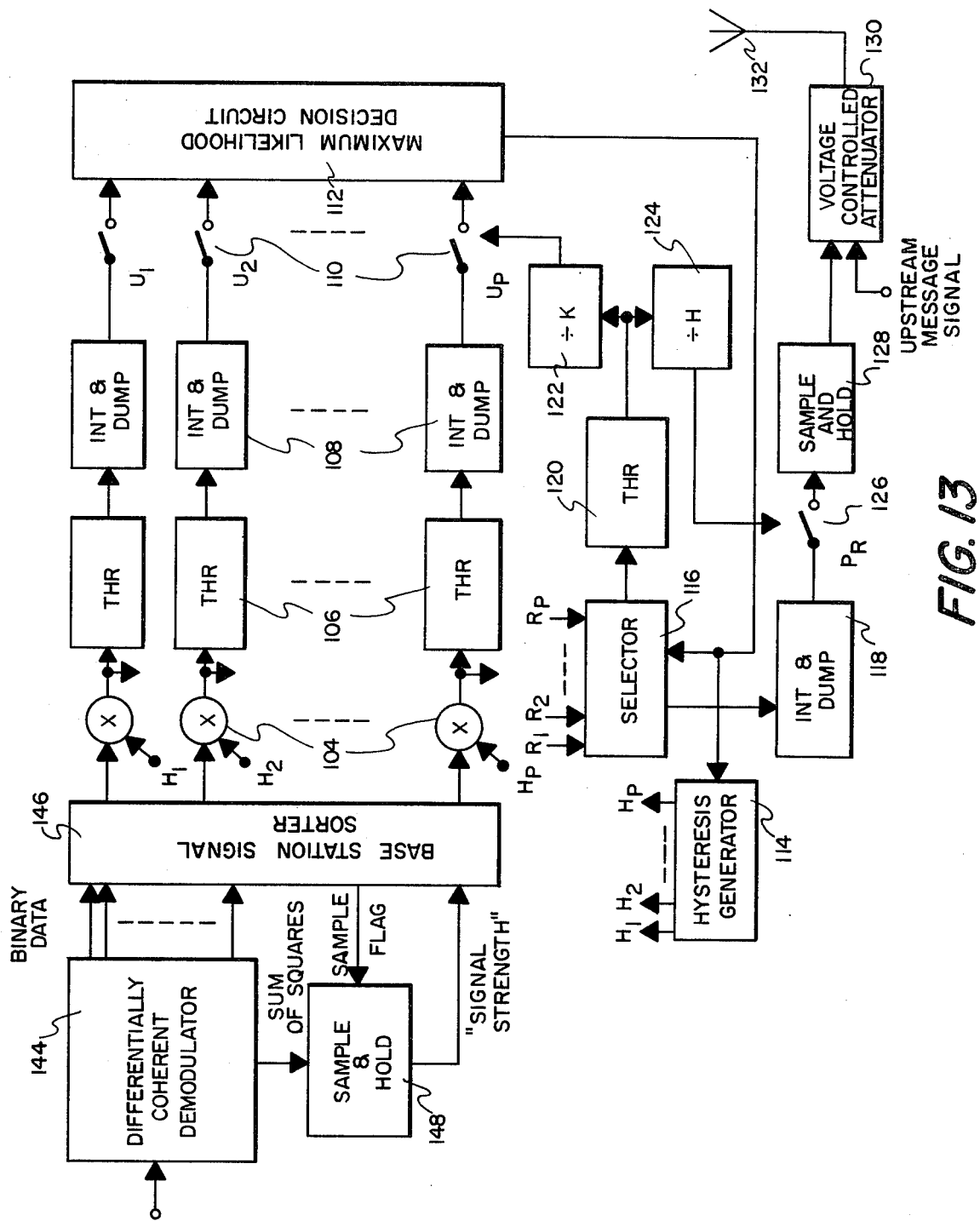
FIG. 13 is a block diagram of an alternate embodiment of the power control/mobile locator system that can be utilized in this invention.

One implementation of such a modified power control/mobile locator is shown in FIG. 13. As shown, the functions of this modified power controller/mobile locator are the same as described in connection with the unit as shown in FIG. 12 except that the input from the IF is coupled to a differentially coherent demodulator 144, the binary data output from which is coupled through base station signal sorter 146 to the weighting circuits 104, and the sum of squares output from which is coupled through sample and hold circuit 148 to the base station signal sorter 146 as a signal strength signal.

If a digitized version of the signal-strength signal is made available, the entire operation of the power control/mobile locator system may be implemented digitally. A high-speed microprocessor, supported by suitable software would be ideal for this purpose, and could probably form the nucleus of the entire receiver.

The spread spectrum apparatus and method is claimed in the co-pending U.S. Patent Applications filed by George R. Cooper and by George R. Cooper and Raymond W. Nettleton and form no part of this invention except to show the preferred embodiment thereof.

What is claimed is:

1. A signal demodulation unit for a spread spectrum communication system, said demodulation unit comprising:
   first means for receiving a spread spectrum input signal that includes waveforms having time chips and demodulating the information contained in the time chips of two adjacent waveforms thereof to produce therefrom a demodulated signal output, said first means including one of a plurality of mixers electrically connected with the input and output of a tapped delay line and a plurality of filters and mixers electrically connected with delays; and
   second means connected with said first means to receive said demodulated signal output and responsive to an output therefrom deciding if the input signal is the desired signal and if so decoding the same.

2. The signal demodulation unit of claim 1 wherein said first means includes mixers connected with the input and outputs of said tapped delay line with said mixers connected with the outputs of said tapped delay line also being connected with bandpass filters.

3. The signal demodulation unit of claim 2 wherein said mixers connected with the input and output of said tapped delay line includes one mixer connected with said input through a lowpass filter.

4. The signal demodulation unit of claim 1 wherein the outputs of said delays are connected with the inputs of said mixers.

5. The signal demodulation unit of claim 4 wherein the inputs of said delays are connected with said filters.

6. The signal demodulation unit of claim 4 wherein said delays include first and second delays with the output of said first delays being coupled to said second delays and to said mixers.

7. In a spread spectrum communication apparatus for a cellular communication system, a signal demodulator comprising:
   a tapped delay line having an input and a plurality of outputs;
   a first mixer connected to receive an incoming signal and having the output of said mixer connected with the input to said tapped delay line;
   a plurality of second mixers connected with the outputs of said tapped delay line; and
   a plurality of filters connected with said plurality of second mixers to receive the outputs therefrom, said filters providing demodulated output signals at the outputs thereof.

8. The demodulator of claim 7 wherein said demodulator includes lowpass filter means connected between said first mixer and said tapped delay line.

9. In a spread spectrum communication apparatus for a cellular communication system, a narrowband signal demodulator comprising:
   an input for receiving incoming signals;
   a plurality of bandpass filters connected with said input to receive said incoming signals therefrom and providing different outputs indicative thereof;
   a plurality of delays each of which is electrically connected with no more than one of said bandpass filters to receive the outputs therefrom so that each of said different outputs from said plurality of bandpass filters is received by a different filter; and
   a plurality of mixers connected with said delays, said mixers providing demodulated signal outputs based upon each of said different outputs from said plurality of bandpass filters.

10. The demodulator of claim 9 wherein said plurality of delays include first and second delays connected with different ones of said mixers with each of said first delays also being connected with a different one of said second delays.

11. The demodulator of claim 9 wherein one of said mixers is connected with one of said delays and one of said bandpass filters which is also connected with said one of said delays to provide an input thereto.

* * * * *